Nov. 15, 1966  LE ROY R. BOGGS  3,284,852
EQUIPMENT FOR MAKING PLASTIC ARTICLES
Original Filed July 20, 1960  3 Sheets-Sheet 1
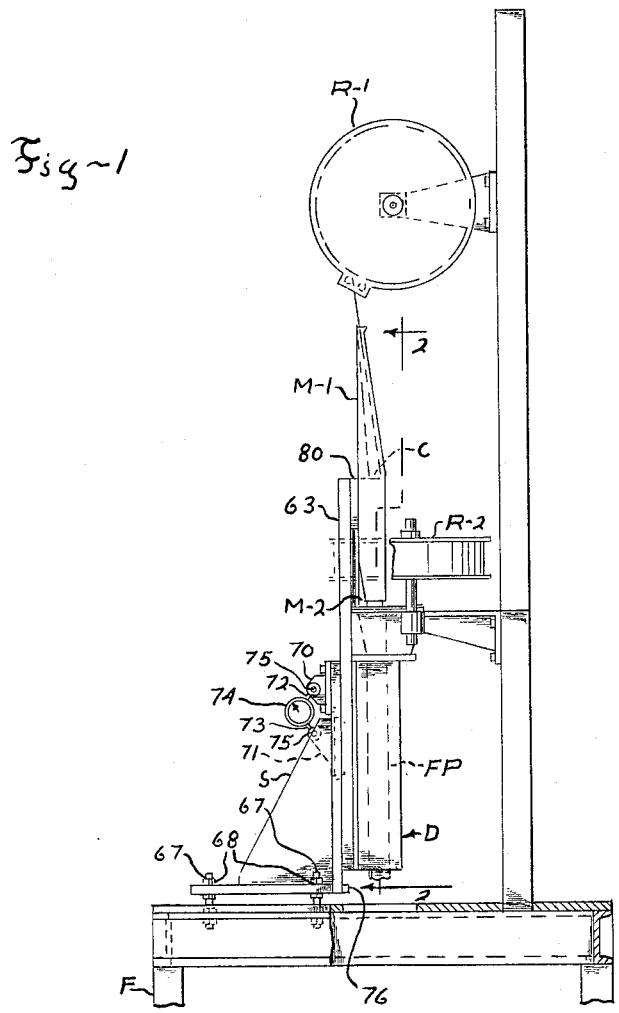
INVENTOR.
Le Roy R. Boggs
BY
ATTORNEYS

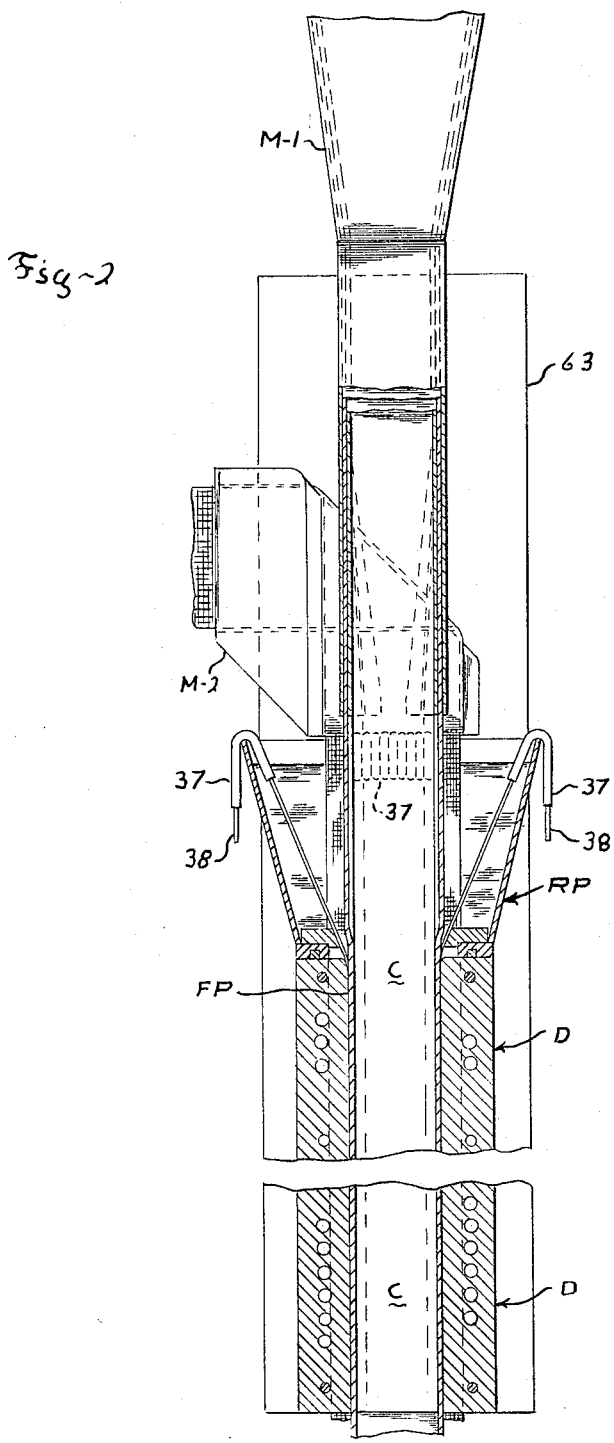

Nov. 15, 1966 LE ROY R. BOGGS 3,284,852
EQUIPMENT FOR MAKING PLASTIC ARTICLES
Original Filed July 20, 1960 3 Sheets-Sheet 3
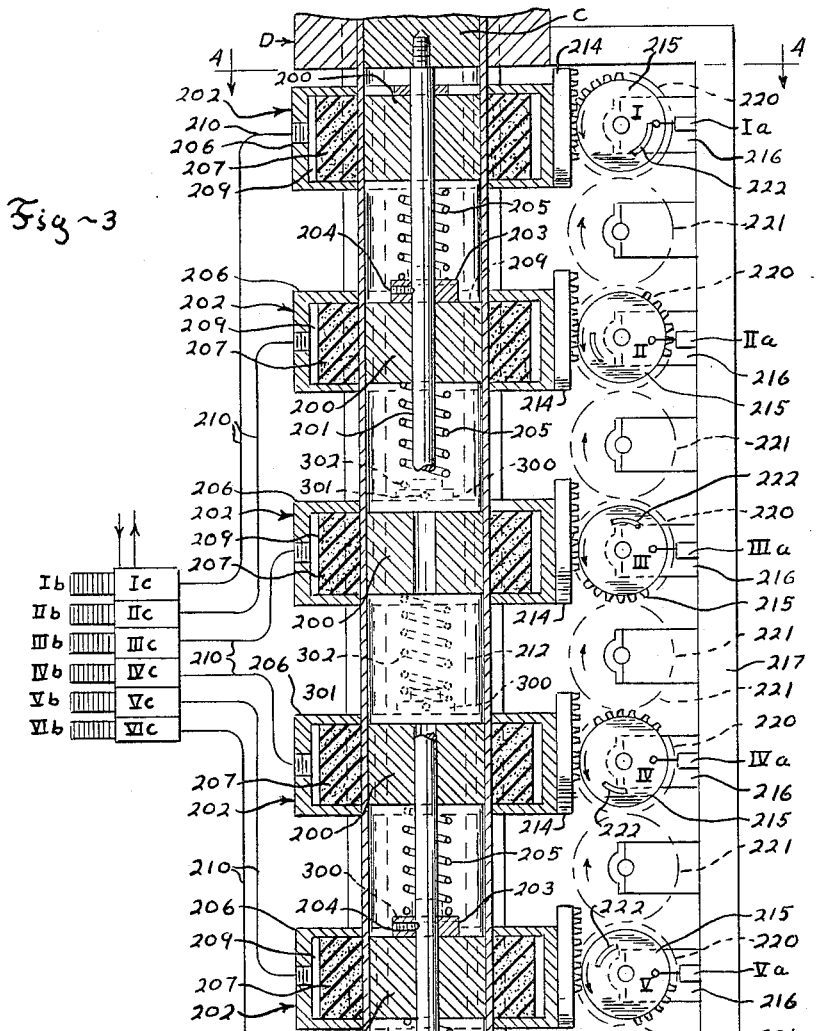
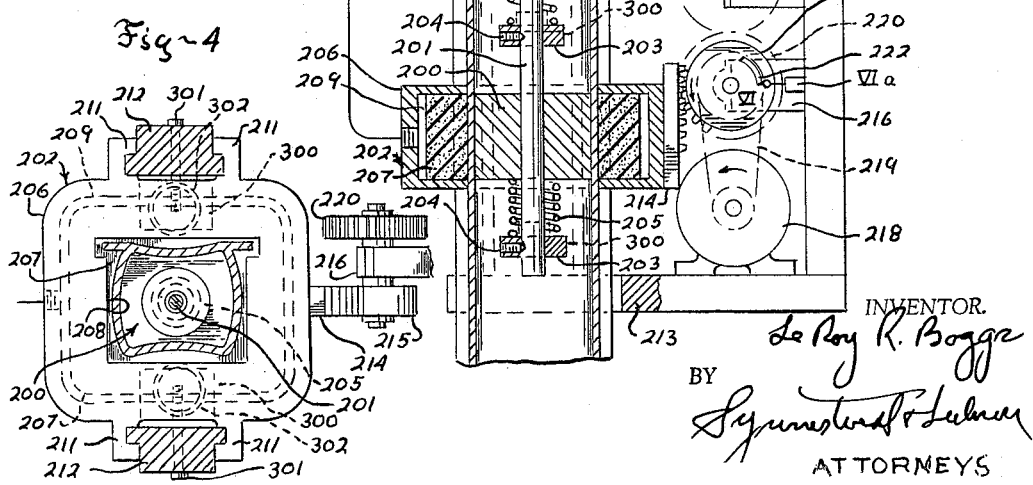
INVENTOR.
Le Roy R. Boggs
BY
ATTORNEYS

United States Patent Office 3,284,852
Patented Nov. 15, 1966

3,284,852
EQUIPMENT FOR MAKING PLASTIC ARTICLES
Le Roy R. Boggs, Bristol, Tenn., assignor to Universal Moulded Fiber Glass Corp., Bristol, Va., a corporation of Delaware
Original application July 20, 1960, Ser. No. 44,050, now Patent No. 3,185,603, dated May 25, 1965. Divided and this application Jan. 22, 1965, Ser. No. 427,244
8 Claims. (Cl. 18—14)

This application is a division of my copending U.S. application Serial No. 44,050 entitled, "Method and Equipment for Making Fiber Reinforced Plastic Shapes," filed July 20, 1960, issued as Patent 3,185,603, on May 25, 1965, and assigned to the same assignee as this application.

This invention relates to apparatus for the production of plastic articles, especially elongated plastic articles, and is particularly concerned with equipment in which the plastic articles are pulled through a forming passage in a forming device.

The apparatus of the invention is useful in the production of a wide variety of elongated plastic articles, but many of the features of the invention are especially suited for use in the production of hollow tube-like plastic members, such as the downspout disclosed in connection with parent application 44,050 and deeply developed channel sections having an interior hollow, such as the rain gutter disclosed in parent application 44,050.

In accordance with the present invention equipment is provided which is especially adapted to produce elongated articles which are designedly relatively thin-walled. In equipment of the kind contemplated by the invention, the production of such articles involves moving the newly formed articles through zones of high friction. In order to accomplish this movement it is necessary to apply considerable pulling forces on the newly formed plastic article. This is particularly the case when, as in the preferred embodiment of the invention, the article produced is moved through the equipment chiefly or entirely by the pulling force, as distinguished from being primarily pushed by the action of an extruder screw or other device.

In order to insure that the thin-walled hollow articles being formed have the tensile strength needed to enable them to withstand the required pulling forces, the invention provides equipment for feeding and positioning fiber reinforcements in the article being formed, which reinforcements become a permanent part of the articles. Moreover, the invention provides a special form of pulling equipment adapted to avoid damage to the thin-walled hollow articles being made.

The equipment of the invention is especially arranged to engage the newly formed elongated article only frictionally, as distinguished from more permanent type engagement, such as bolt fastenings, etc. From the foregoing, it can be understood that in order to obtain adequate frictional engagement between the newly formed elongated article and the pulling device by which it is moved or extracted from the region of high friction, it is necessary for the pulling device to press against the surface of the article with considerable force.

It is an important aspect of this invention to provide superior means for developing this force in the production of thin-walled hollow pieces even though with such pieces there is a potential danger of crushing the newly formed article in an effort to grip it securely enough with the pulling device to accomplish the pulling operation.

Among the objects of this invention is the provision of novel plastics forming equipment and combinations of equipment for successfully gripping and pulling newly formed articles, such as hollow articles, even though they must be tightly gripped and pulled on with considerable force and even though they are relatively thin-walled or otherwise fragile in construction.

In accordance with another aspect of the invention it should be noted that the equipment provided is especially adapted for the continuous production and withdrawal of the product. While the equipment can be utilized to form articles intermittently, it is sometimes of advantage to form and withdraw them substantially continuously in order to mechanize the production and to improve the quality of the product, especially its uniformity.

A preferred embodiment of the present invention includes plastics forming equipment for producing elongated plastic articles in which the section of the equipment wherein the article is formed includes a forming die having a core mounted therein and cooperating therewith to establish a forming passage through the die. Certain features of the withdrawing equipment provided in accordance with the invention are specially adapted to cooperate with the foregoing arrangement of the forming die for the production of a hollow elongated article.

It should be noted that the methods disclosed and claimed in parent application 44,050 can be advantageously be practiced with equipment of this invention, as well as with other equipment, and that some of the equipment and equipment features disclosed and claimed in the parent application can be effectively used with the equipment of the present invention.

The above objects and purposes together with other objects and purposes may best be understood by considering the detailed description which follows together with the accompanying drawings in which:

FIGURE 1 of this application corresponds to FIGURE 2 of the parent. FIGURE 1 is an elevational view of plastics forming equipment arranged in accordance with the invention, with the withdrawing equipment of the invention omitted from the view for the sake of simplicity;

FIGURE 2 is a modification of FIGURE 14 of the parent with part of the mat guide omitted and with more of the die shown. FIGURE 2 is an enlarged vertical section of the equipment shown in FIGURE 1, the section being taken on line 2—2 of FIGURE 1;

FIGURE 3 is the same as FIGURE 28 of the parent. FIGURE 3 is a more or less diagrammatic vertical sectional view illustrating a continuous drive or withdrawing mechanism constructed in accordance with the invention;

FIGURE 4 is FIGURE 29 of the parent. FIGURE 4 is a plan section taken on line 4—4 of FIGURE 3.

Attention is first directed to FIGURE 1 which illustrates a plastics forming machine in connection with which the present invention is effectively used and disclosed both in the present as well as the parent application. The machine includes a forming die D having a forming passage extending therethrough generally from top to bottom of the die D as it is shown in FIGURES 1 and 2. In those figures the forming passage is marked FP. The die D is carried on a mounting plate 63 which is in turn slidably mounted on supporting bracket S for up and down movement. The supporting bracket is adjustably mounted on the main framework F as by studs 67 and adjusting nuts 68.

A dynamometer bracket 70 is secured to the supporting bracket S and a similar bracket 71 is secured to the mounting plate 63. The arms 72–73 of a dynamometer 74 are secured to the brackets 70 and 71 by bolts 75, 75.

It will be noted that by virtue of the slidable mounting of the mounting plate and die in the supporting bracket S and the connection of the brackets 70 and 71 to the dynamometer arms, the pull exerted in extracting the downspout from the die is registered on the dynamometer. By way of example, the downward movement of the die under this pull would be approximately $\frac{1}{16}''$ at 10,000 lbs. A limit stop 76 engageable by the plate 63 is provided to limit the downward movement of the die, if, for example, the dynamometer is disconnected.

In order to produce closed or tubular products such as downspouts a core C contoured to match the contour of the inside shape of the article being formed is employed.

The core C is secured to mounting plate 63 by means of a spacer block 80 and bolts, so that it is suspended therefrom and extends downwardly for the length of the die. The contour of the core generally matches the contour of the die and is in spaced relation to the walls of the die cavity or passage, the amount of the space determining the wall thickness of the tube-like member such as a downspout to be extracted from the die.

The apparatus shown in FIGURES 1 and 2 is especially adapted to produce fiber reinforced plastic articles; such articles are generally made up of a fiber reinforcing material, such as glass fiber which has been impregnated with a resinous plastic material to form an article having a composite structure exploiting the useful properties both of the reinforcing material and the resin. The resin is preferably of the heat-hardenable or thermosetting type such as polyester resin. The equipment shown in the drawings is especially adapted to use with such heat curable or heat-hardenable thermosetting resin or plastic materials having a liquid stage before curing and a solid stage after curing.

The reinforcing employed may be of several kinds including felted mats, woven pieces and rovings. While glass is the preferred type of reinforcing fiber for many applications, various other kinds of fiber material can be employed.

The equipment shown in FIGURES 1 and 2 is the kind in which unformed plastic is fed into the upper or entrance end of the forming passage FP in the die D and a formed or completed member is withdrawn from the lower or exit end of the forming passage. The unformed plastic, for example polyester resin in liquid form, is supplied to the forming die by means of a resin pan RP which as is shown most clearly in FIGURE 2 is positioned immediately above die D and is provided with openings in the bottom so that unformed or liquid plastic material can flow from the resin pan into the forming passage. Equipment is also provided for feeding fiber reinforcing material into the entrance end of the die. This equipment includes two mat reels R–1 and R–2 and two mat guides M–1 and M–2. The mat guides are configured to pre-shape the fiber reinforcing mats so that they will be properly positioned within the forming passage to reinforce an article of the kind being formed. Provision is also made for feeding reinforcing fibers in the form of rovings into the entrance end of the forming passage. To this end, roving guide tubes 37, shown in FIGURE 2, are provided on the resin pan RP to guide rovings 38 into the resin pan and ultimately into the entrance end of the die.

Both the die and the core are provided with a cooling zone at the entrance end and adjacent to the resin bath for cooling the resin pan and the entrance region of the die as well as the resin in the resin pan, sufficiently to maintain the liquid condition of the resin in the pan, an intermediate heating zone, maintaining a desired temperature for proper curing or solidification of the product and a lower cooling zone at the exit end of the die providing after-cooling of the product adapted to reduce the temperature of the material down below the heat distortion point (preferably at least 50° below) before the product leaves the die. Thus the product is cooled as it leaves the die rather than having it cool gradually after exit from the die. This reduces distortion of the product to a negligible amount.

With the foregoing description of the equipment in hand, it is now possible to outline briefly the general mode of operation of the part of the apparatus discussed thus far. Heat hardenable resin is placed in the resin pan, and fiber reinforcing material, principally the mats carried on reels R–1 and R–2 and the rovings 38, is passed through the liquid resin in the resin pan, and while being so passed is preshaped in form to accommodate it to the shape of the forming passage. During the passage of the reinforcing material through the resin pan it becomes thoroughly coated and impregnated with liquid resin. Thus, it can be seen that the material entering the forming passage through its entrance end is made up of reinforcing material substantially saturated with liquid resin which it carries with it into the forming passage.

The entrance end of the forming passage is cooled for reasons more fully discussed in connection with application Serial No. 44,050. Here it may be noted that the entrance end of the forming passage is desirably flared or enlarged so that the excess resin and air bubbles will be forced out of the reinforcings as they are compressed in their movement through the entrance end of the forming passage, and the excess resin thus squeezed out is returned to the resin pan RP. By cooling the entrance end of the die, assurance is obtained that the excess resin so returned is not cured or partly cured.

The central region of the die and of the core is heated by the heating elements provided therein to a temperature sufficient to effect curing or solidification of the resin which saturates the reinforcings. The unformed plastic is thus formed into a hardened plastic article or member, reinforced with fibers such as glass fibers. The solidified member is cooled in the lower portion of the die and is withdrawn from the exit end or lower end of the die by equipment to be discussed later.

From the foregoing brief outline, it can be understood that this equipment is fully capable of producing articles of indefinite length, continuously, although for many purposes the continuously formed article will be cut into sections of convenient length as it is formed. It should also be understood that this equipment is capable of producing articles intermittently in the sense that the formed article does not necessarily have to be withdrawn from the exit end of the forming passage continously. On the contrary the withdrawal can be interrupted or intermittent.

In the parent application Serial No. 44,050 there are disclosed two forms of puller mechanisms adapted for use with forming apparatus of the kind disclosed above. In the embodiment of FIGURES 1 to 27 of the parent application the puller mechanism incorporates a vice which is adapted to grip the article being formed and pull a predetermined length of that article from the forming apparatus. Such predetermined length is then cut off and the vice is returned to starting position in order to grip and pull a succeeding length. The other embodiment of puller mechanism appears in the parent application in FIGURES 28 and 29 and is also illustrated in FIGURES 3 and 4 of the present application, the present application being directed to the form of puller mechanism of those figures, which is also adapted for use with forming apparatus of the kind shown in FIGURES 1 and 2.

FIGURES 3 and 4 illustrate mechanism, in a more or less diagrammatic manner, for the continuous extraction of a closed or tubular product such as the downspout DS from the die D and core C.

The mechanism comprises a plurality of spring loaded slugs 200 located internally of the tubular downspout and slidably mounted on a depending rod 201 carried by the core C, and a plurality of external spring loaded grippers 202 associated with the internal slugs 200.

Although I have shown six slugs and grippers, it is to be understood the number thereof may be increased or decreased as desired.

The vertical spacing of the slugs and grippers is determined by the length of stroke to be imparted to them.

The spacing of the slugs is provided by means of spaced collars 203 screwed to the rod 201 by set screws 204. Each slug is provided with a loading spring 205 extending between the slug and an adjacent collar for urging the slug upwardly.

The spacing of the grippers 202 is provided by spaced lugs 300, 300 secured to the upright rails 212, 212 by screws 301, 301. Each gripper 202 is provided with a loading spring 302 extending between the gripper and adjacent lugs 300, 300 for urging the gripper upwardly.

Each gripper 202 is composed of an annular housing 206 surrounding the downspout, and housing pliable material 207 adapted to grip the downspout. The material 207 has a central opening 208 configurated to match the configuration of the downspout and is of a size to leave an annular space between it and the housing which constitutes a pressure chamber 209. Fluid under pressure is admitted to the pressure chambers by means of valve controlled supply lines 210.

The housing is provided with gibs 211, 211 at its sides adapted to ride in upright rails 212, 212 extending from the die downwardly to the base member 213.

Each housing 206 is also provided with an upright side rack 214 adapted to mesh with the teeth of a mutilated gear 215 rotatably mounted in a bearing block 216 supported from the upright frame member 217.

Rotation in a counterclockwise direction is imparted to the mutilated gears 215 by means of a motor 218, chain drive 219, and a train of gears comprising gears 220 secured on the mutilated gear shafts and meshing idler gears 221.

The number of teeth of the mutilated gears and the radial relation of the teeth of the gears to each other is such that at all times the teeth of at least one of the gears are in mesh with a rack.

For example, in the particular arrangement illustrated it will be noted that the teeth of gear I are in engagement with its rack and its gripper has been moved slightly downwardly and that the teeth of gear VI are in engagement with its rack and its gripper has been moved downwardly almost to the end of its downstroke.

Each mutilated gear is provided with a switch operating cam 222 for activating an associated switch which controls a solenoid for activating a valve supplying pressure fluid to a gripper. In the position shown in FIGURE 28 the cam of gear I has engaged switch I$a$ to energize solenoid I$b$ of valve I$c$ so as to admit pressure fluid to the pressure chamber of the top gripper. This compresses the pliable material 207 and grips the downspout between it and the slug 200 thus moving the downspout and the slug downwardly as the gear I continues to rotate. Thus it can be seen that the slug opposes the squeezing force applied by the gripper through the pliable material 207 and thus limits the distortion of the shape of the downspout which tends to occur as a result of the squeezing force. The slug moves downwardly with the downspout when the distortion caused by the gripper during its downward movement is large enough so that the gripper, the downspout, and the slug 200 are frictionally coupled for united movement downwardly together. From the foregoing it will be understood that the slug 200 will not move downwardly upon the application of every squeezing force by the gripper. For example, under some conditions the squeezing force required to frictionally engage the gripper and the downspout may be smaller than the force required to distort the downspout against the slug as explained above. Furthermore, the squeezing force applied by the gripper under some conditions is so distributed around the periphery of the downspout or other tube-like member that no distortion occurs even though a squeezing force of considerable magnitude is developed.

While the gear I continues to rotate, the cam of gear VI has closed switch VI$a$ to energize solenoid VI$b$ of valve VI$c$ so as to similarly activate the bottom gripper. Thus both the top and bottom grippers are exerting a pull on the downspout to extract it from the die. The remaining four grippers are at this time in released position.

As rotation of the gears continues the teeth of gear VI leave its rack and the switch cam leaves switch VI$a$ to de-energize solenoid VI$b$ of valve VI$c$ to exhaust pressure from the gripper chamber and allow the associated slug 200 to be moved upwardly against its collar 203 under the influence of its spring 205.

Similarly, the associated gripper 202 moves upwardly against its lugs 300, 300 under the influence of its spring 302.

The slug and gripper remain in the up position until the teeth of gear VI next engage its rack.

However, it is pointed out that at the time the teeth of gear VI leave its rack the teeth of gear I are still in mesh with its rack so that pull is exerted on the downspout without interruption.

Following on through a cycle of operation, it is pointed out that before the teeth of gear I leave its rack, the switch IV$a$ is closed to energize solenoid IV$b$ of valve IV$c$ to cause the fourth gripper to grip the downspout.

Similarly, gear II activates the second gripper before the fourth gripper is released and next the gear V activates the fifth gripper before the second gripper is released. Then the gear III activates the third gripper before the fifth gripper is released and next the gear VI activates the sixth or bottom gripper before the third gripper is released. Finally, to complete a cycle of operation, gear I activates the first or top gripper before the sixth gripper is released. The above cycle then repeats; thus it can be seen that the order of gripping is I, IV, II, V, III, VI, and repeat.

The employment of a drawing mechanism operating continuously, as described above, is of special advantage where pieces of substantially indefinite length are desired. Such an arrangement also avoids periodic stoppage of the operation and this improves the uniformity of the extracted shape, so that pieces can be cut off at desired lengths and such pieces will be of substantially homogeneous or uniform structure and appearance throughout the length thereof, without even any marking at a point corresponding to an interval of stoppage of the machine, such as may sometimes occur where intermittently operating drawing mechanism is used.

I claim:

1. Apparatus for forming hollow tube-like members from hardenable resin material comprising a forming die having a passage therethrough and a die core positioned therein to define with the die passage an annular generally straight forming passage in which resin material is shaped and solidified to form a tube-like member, said forming passage having an entrance end through which unformed resin material is fed for forming and hardening and an exit end through which a formed tube-like member is withdrawn, and withdrawing means comprising a gripping device mounted adjacent the exit end of said forming machine for movement through a pulling stroke in the direction of withdrawal of the formed elongated member from said exit end, said gripping device comprising an annular gripper element of pliable material surrounding the member being withdrawn, said gripper having a hole therethrough generally conforming to the cross-sectional shape of the member being formed, a slug movably mounted on said core, said slug being sized and positioned to fit inside the member being formed adjacent said gripper element, means for compressing said gripper element to tightly engage the member being withdrawn, and means for moving said gripper element in the direction of withdrawal.

2. Apparatus for forming hollow tube-like members from hardenable resin material comprising a forming die having a passage therethrough substantially conforming, for at least part of the length thereof, with the external configuration of the tube-like member to be formed, a die core positioned in the passage of the forming die, said core having a shape conforming, for at least part of the length thereof, with the internal configuration of the tube-like member to be formed, said die and die core together defining a forming passage in which the resin material is shaped and solidified to form a tube-like member, means for introducing resin material into one end of the forming passage, mounting means for said die core adjacent said one end of the forming passage for mounting the core in the die, and withdrawing means mounted at the other end of said die for withdrawing the formed tube-like member therefrom, said withdrawing means comprising an external gripper having a gripping surface conformable to at least part of the external shape of the tube-like member, mounting means for said gripper adapted to establish a path of movement therefor generally in the direction of feed through said forming passage, means for moving said gripper through said path of movement in a direction away from said die, pressure means urging said gripper against a tube-like member being withdrawn from said die, and a slug moveably mounted on said core beyond the exit end of the forming passage, said slug being sized to slidingly fit within the formed tube-like member being withdrawn therefrom and positioned with respect to said gripper to oppose said squeezing force applied by the gripper and to limit distortion of the shape of the tube-like member by said squeezing force, said slug being mounted on the core for movement in the direction of withdrawal of the formed member upon application by the gripper of a force large enough to frictionally engage the gripper, the tube-like member, and the slug, for united movement together.

3. Withdrawing apparatus for withdrawing elongated members of hardened resin material from the exit end of a forming machine wherein said elongated members are formed from unformed resin material, said withdrawing apparatus being positioned adjacent the exit end of said forming machine and comprising a plurality of gripping devices spaced from each other along the direction of withdrawal of the formed member from the forming machine, each such gripping device being mounted for movement through a pulling stroke extending in the direction of withdrawal of the formed member, and through a return stroke substantially opposed to the pulling stroke, each gripping device having a driving rack mounted thereon, for each gripping device a mutilated drive gear mounted for rotation and positioned with respect to the driving rack of said gripping device to drivingly engage the rack upon being rotated to thereby move the gripping device through a pulling stroke, and driving means for said mutilated gears comprising a source of driving power and a drive train interposed between the power source and said gears, said drive train being constructed and arranged to fix the relative angular positions of said mutilated gears with respect to each other and thereby provide for sequential movement of said gripping devices through their respective pulling strokes.

4. Apparatus according to claim 3 and further comprising yielding return means mounted to yieldingly oppose the movement of said gripping devices through their pulling strokes and to move them through their return strokes upon completion of a pulling stroke.

5. Apparatus for forming hollow tube-like members from hardenable resin material comprising a forming die having a passage therethrough and a die core positioned therein to define with the die passage an annular generally straight forming passage in which resin material is shaped and solidified to form a tube-like member, said forming passage having an entrance end through which unformed resin material is fed for forming and hardening and an exit end through which a formed tube-like member is withdrawn, and withdrawing means comprising a plurality of gripping devices spaced from each other along the direction of withdrawal of the formed member from the forming machine, each such gripping device being mounted for movement from a rest position through a pulling stroke extending in the direction of withdrawal of the formed member, each of said gripping devices having a hollow gripping element made of pliable material surrounding the formed member being withdrawn and adapted to grip said formed member on all sides thereof, an extension piece mounted on said core at the exit end of the forming passage and extending in the direction of withdrawal of a formed member through each of the hollow gripping elements of said gripping devices, and a plurality of slugs, one for each of said gripping devices, movably mounted on said extension piece, each such slug being sized to slidingly fit within the tube-like member being withdrawn, and each such slug being mounted for movement from a rest position substantially corresponding to the rest position of its gripping device through a following stroke corresponding to the pulling stroke of its gripping device when gripped through the formed member being withdrawn by its gripping device.

6. Apparatus for use in forming a tubular article from hardenable resin material including in combination with a die and die core defining an annular forming passage in which the resin material is shaped and solidified, a slug adapted to engage the inside surface of the tubular article being made and yieldingly mounted on the downstream end of the core in the direction of delivery of the article being formed, gripping means adapted to engage the external surface of the article being formed in the plane of said slug, and means for driving said gripping means in the direction of delivery of the article being formed.

7. Apparatus for forming hollow tube-like members from hardenable resin material comprising a forming die having a passage therethrough and a die core positioned therein to define with the die passage an annular generally straight forming passage in which resin material is shaped and solidified to form a tube-like member, said forming passage having an entrance end through which unformed resin material is fed for forming and hardening, and an exit end through which a formed tube-like member is withdrawn, and withdrawing means comprising an external gripper mounted for movement through a pulling stroke extending in the direction of withdrawal of the formed member from said die, means for applying a squeezing force through said gripper on the formed tube-like member being withdrawn from said passage, and a slug moveably mounted on said core beyond the exit end of the forming passage, said slug being sized to slidingly fit within the formed tube-like member being withdrawn therefrom and positioned with respect to said gripper to oppose said squeezing force applied by the gripper and to limit distortion of the shape of the tube-like member by said squeezing force, said slug being mounted on the core for movement in the direction of withdrawal of the formed member upon application by the gripper of a force large enough to frictionally engage the gripper, the tube-like member, and the slug, for united movement together.

8. Apparatus for forming hollow tube-like members from hardenable resin material comprising a forming die having a vertical passage therethrough and a die core positioned therein to define with the die passage an annular generally straight vertical forming passage in which resin material is shaped and solidified to form a tube-like member, said forming passage having an upper entrance end through which unformed resin material is fed for forming and hardening and a lower exit end through which a formed tube-like member is withdrawn, mounting means for said die core positioned above the entrance end of the forming die, and withdrawing means mounted below said forming die at the exit end of said forming passage comprising, a puller frame mounted in fixed relation to the forming die, an external gripper mounted for sliding vertical movement on said puller frame through a pulling stroke extending downwardly from said forming die, means for applying a squeezing force through said gripper on the formed tube-like member being withdrawn from said passage, and a slug mounted on said core and depending therefrom beneath the exit end of the forming passage, said slug being sized to slidingly fit within a tube-like member being withdrawn therefrom and positioned with respect to said gripper to oppose said squeezing force applied by the gripper, and to limit distortion of the shape of the tube-like member by said squeezing force, said slug being mounted on the core for downward movement upon application by the gripper of a squeezing force large enough to frictionally engage the gripper, the tube-like member, and the slug, for united movement downwardly together.

References Cited by the Examiner

UNITED STATES PATENTS

| | | | |
|---|---|---|---|
| 1,767,692 | 6/1930 | Morin | 226—112 |
| 2,126,453 | 8/1935 | Criley et al. | |
| 2,586,536 | 2/1952 | Haller | 24—244 |
| 2,775,869 | 1/1957 | Pointer | 24—263.5 X |
| 2,921,108 | 1/1960 | Meffert. | |
| 2,990,091 | 2/1961 | Goldsworthy et al. | 226—112 |

WILLIAM J. STEPHENSON, *Primary Examiner.*

MARCUS U. LYONS, L. S. SQUIRES,
*Assistant Examiners.*